US012629740B2

(12) United States Patent
Urabe

(10) Patent No.: US 12,629,740 B2
(45) Date of Patent: May 19, 2026

(54) METHOD, DEVICE, AND PROGRAM OF EVALUATING SPRINGBACK AMOUNT OF PRESS FORMED PART, AND METHOD OF MANUFACTURING PRESS FORMED PART

(71) Applicant: JFE STEEL CORPORATION, Tokyo (JP)

(72) Inventor: Masaki Urabe, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 236 days.

(21) Appl. No.: 18/715,257

(22) PCT Filed: Dec. 13, 2022

(86) PCT No.: PCT/JP2022/045837
§ 371 (c)(1),
(2) Date: May 31, 2024

(87) PCT Pub. No.: WO2023/136023
PCT Pub. Date: Jul. 20, 2023

(65) Prior Publication Data
US 2025/0025926 A1 Jan. 23, 2025

(30) Foreign Application Priority Data

Jan. 11, 2022 (JP) ................................. 2022-002020
Oct. 28, 2022 (JP) ................................. 2022-172879

(51) Int. Cl.
*B21D 22/00* (2006.01)
*B21D 22/02* (2006.01)
(Continued)

(52) U.S. Cl.
CPC ............. *B21D 22/02* (2013.01); *B21D 22/20* (2013.01); *G06F 30/15* (2020.01); *G06F 30/20* (2020.01); *G06F 30/23* (2020.01); *G06F 2113/24* (2020.01)

(58) Field of Classification Search
CPC ............................ G06F 2113/24; G06F 30/23
See application file for complete search history.

(56) References Cited

U.S. PATENT DOCUMENTS 9,868,145 B2 * 1/2018 Suzuki ................... B21D 22/00
2011/0246150 A1 10/2011 Miyagi et al.
(Continued)

FOREIGN PATENT DOCUMENTS

EP        3 919 197 A1    12/2021
JP        2006-185228 A    7/2006
(Continued)

OTHER PUBLICATIONS

Mar. 3, 2025 Search Report issued in European Patent Application No. 22920541.4.
(Continued)

*Primary Examiner* — Atul P. Khare
(74) *Attorney, Agent, or Firm* — Oliff PLC

(57) ABSTRACT

A method of evaluating a springback amount of a press formed part includes: obtaining a springback amount of an actual press formed part by giving a predetermined constraint condition to a press formed part workpiece shape model acquired by elastic mechanical analysis including a process of sandwiching the actual press formed part obtained by performing actual press forming and springback up to the forming bottom dead center and performing spring-back analysis; calculating a springback amount by giving the same constraint condition to a press formed part analysis model acquired by elasto-plastic mechanical analysis including a process of press forming the actual press formed part and performing the spring-back analysis; and comparing and evaluating these springback amounts.

6 Claims, 5 Drawing Sheets

(51) Int. Cl.

| | |
|---|---|
| *B21D 22/20* | (2006.01) |
| *G06F 30/15* | (2020.01) |
| *G06F 30/20* | (2020.01) |
| *G06F 30/23* | (2020.01) |
| *G06F 30/10* | (2020.01) |
| *G06F 113/24* | (2020.01) |

(56) References Cited

U.S. PATENT DOCUMENTS

| | | | | |
|---|---|---|---|---|
| 2014/0172391 A1* | 6/2014 | Tokita | .................... | G06F 30/23 |
| | | | | 703/2 |
| 2020/0309635 A1 | 10/2020 | Urabe | | |
| 2022/0088663 A1 | 3/2022 | Urabe | | |
| 2022/0222398 A1 | 7/2022 | Ogawa et al. | | |

FOREIGN PATENT DOCUMENTS

| | | | |
|---|---|---|---|
| JP | 2009-172677 | A | 8/2009 |
| JP | 5834698 | B2 | 12/2015 |
| JP | 2016-20000 | A | 2/2016 |
| JP | 2020-124716 | A | 8/2020 |
| WO | 2020/235288 | A1 | 11/2020 |

OTHER PUBLICATIONS

Feb. 21, 2023 International Search Report issued in International Patent Application No. PCT/JP2022/045837.

Isamu Matsuura, "High Precise Three-dimensional Best-fit for Curved Surface", Industrial Research Center, 2012, pp. 22-25.

"Press Molding Difficulty Handbook 3rd Ed.", Japan Sheet Metal Forming Research Group, Mar. 30, 2007.

* cited by examiner

FIG.1

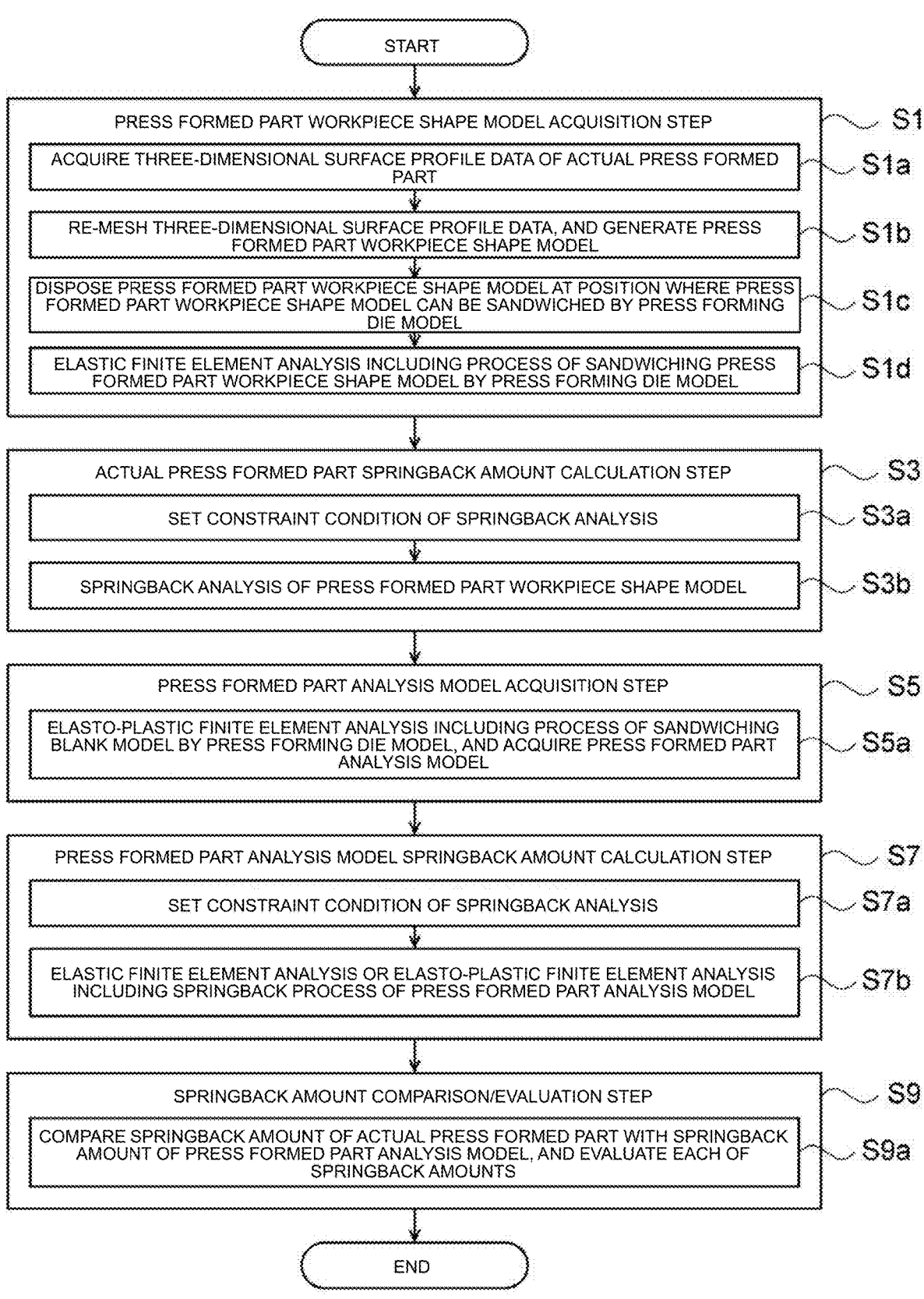

START

PRESS FORMED PART WORKPIECE SHAPE MODEL ACQUISITION STEP — S1

ACQUIRE THREE-DIMENSIONAL SURFACE PROFILE DATA OF ACTUAL PRESS FORMED PART — S1a

RE-MESH THREE-DIMENSIONAL SURFACE PROFILE DATA, AND GENERATE PRESS FORMED PART WORKPIECE SHAPE MODEL — S1b

DISPOSE PRESS FORMED PART WORKPIECE SHAPE MODEL AT POSITION WHERE PRESS FORMED PART WORKPIECE SHAPE MODEL CAN BE SANDWICHED BY PRESS FORMING DIE MODEL — S1c

ELASTIC FINITE ELEMENT ANALYSIS INCLUDING PROCESS OF SANDWICHING PRESS FORMED PART WORKPIECE SHAPE MODEL BY PRESS FORMING DIE MODEL — S1d

ACTUAL PRESS FORMED PART SPRINGBACK AMOUNT CALCULATION STEP — S3

SET CONSTRAINT CONDITION OF SPRINGBACK ANALYSIS — S3a

SPRINGBACK ANALYSIS OF PRESS FORMED PART WORKPIECE SHAPE MODEL — S3b

PRESS FORMED PART ANALYSIS MODEL ACQUISITION STEP — S5

ELASTO-PLASTIC FINITE ELEMENT ANALYSIS INCLUDING PROCESS OF SANDWICHING BLANK MODEL BY PRESS FORMING DIE MODEL, AND ACQUIRE PRESS FORMED PART ANALYSIS MODEL — S5a

PRESS FORMED PART ANALYSIS MODEL SPRINGBACK AMOUNT CALCULATION STEP — S7

SET CONSTRAINT CONDITION OF SPRINGBACK ANALYSIS — S7a

ELASTIC FINITE ELEMENT ANALYSIS OR ELASTO-PLASTIC FINITE ELEMENT ANALYSIS INCLUDING SPRINGBACK PROCESS OF PRESS FORMED PART ANALYSIS MODEL — S7b

SPRINGBACK AMOUNT COMPARISON/EVALUATION STEP — S9

COMPARE SPRINGBACK AMOUNT OF ACTUAL PRESS FORMED PART WITH SPRINGBACK AMOUNT OF PRESS FORMED PART ANALYSIS MODEL, AND EVALUATE EACH OF SPRINGBACK AMOUNTS — S9a

END

FIG.3

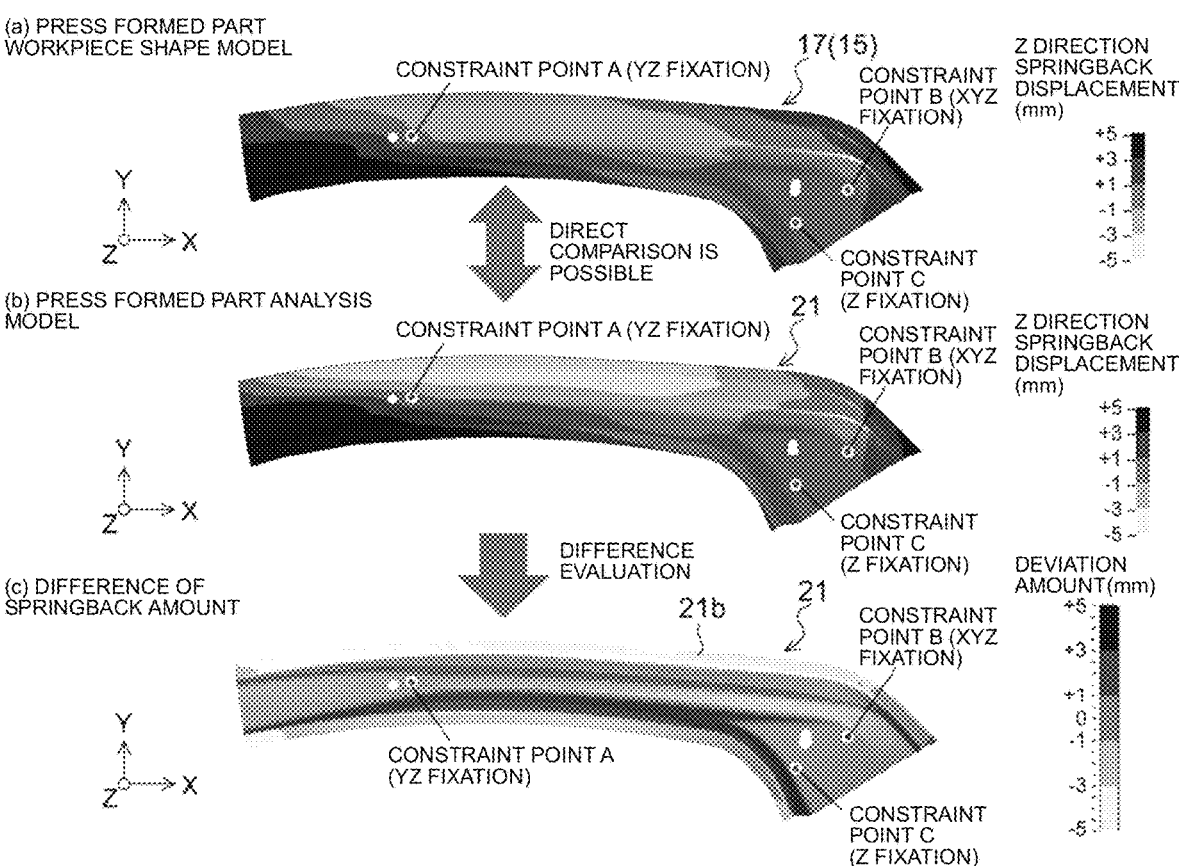

(a) PRESS FORMED PART
WORKPIECE SHAPE MODEL

CONSTRAINT POINT A (YZ FIXATION)     17(15)

CONSTRAINT
POINT B (XYZ
FIXATION)

Z DIRECTION
SPRINGBACK
DISPLACEMENT
(mm)

+5
+3
+1
-1
-3
-5

DIRECT
COMPARISON IS
POSSIBLE

CONSTRAINT
POINT C
(Z FIXATION)

(b) PRESS FORMED PART ANALYSIS
MODEL

CONSTRAINT POINT A (YZ FIXATION)     21

CONSTRAINT
POINT B (XYZ
FIXATION)

Z DIRECTION
SPRINGBACK
DISPLACEMENT
(mm)

+5
+3
+1
-1
-3
-5

DIFFERENCE
EVALUATION

CONSTRAINT
POINT C
(Z FIXATION)

(c) DIFFERENCE OF
SPRINGBACK AMOUNT 21b     21

CONSTRAINT
POINT B (XYZ
FIXATION)

DEVIATION
AMOUNT(mm)

+5

+3

+1
0
-1

-3

-5

CONSTRAINT POINT A
(YZ FIXATION)

CONSTRAINT
POINT C
(Z FIXATION)

FIG.4

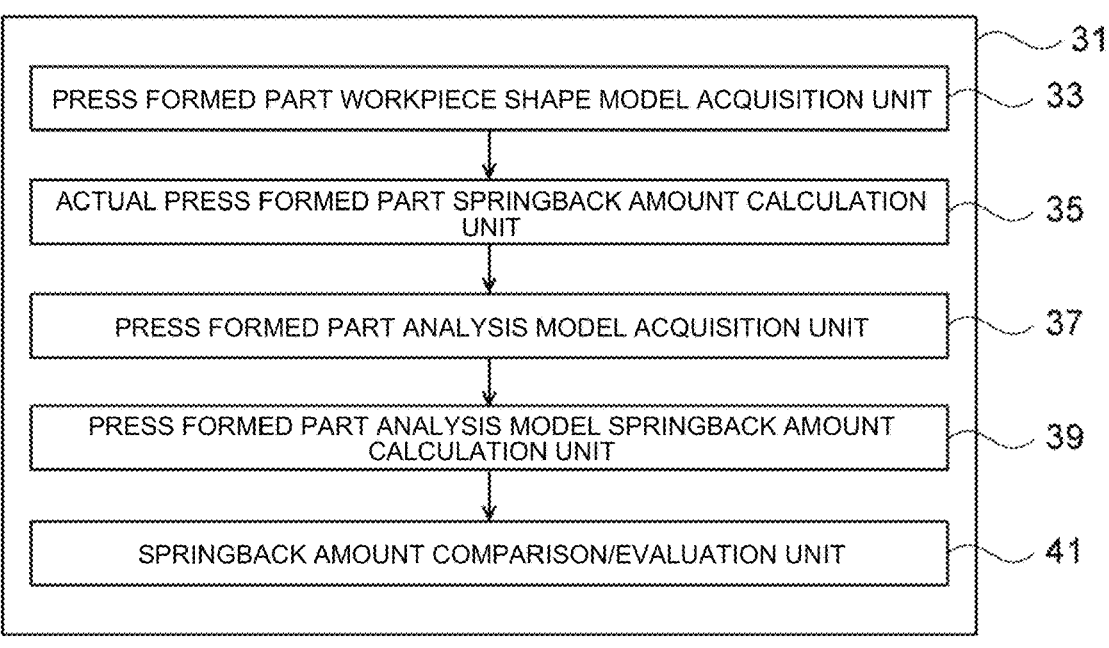

PRESS FORMED PART WORKPIECE SHAPE MODEL ACQUISITION UNIT — 33

ACTUAL PRESS FORMED PART SPRINGBACK AMOUNT CALCULATION UNIT — 35

PRESS FORMED PART ANALYSIS MODEL ACQUISITION UNIT — 37

PRESS FORMED PART ANALYSIS MODEL SPRINGBACK AMOUNT CALCULATION UNIT — 39

SPRINGBACK AMOUNT COMPARISON/EVALUATION UNIT — 41

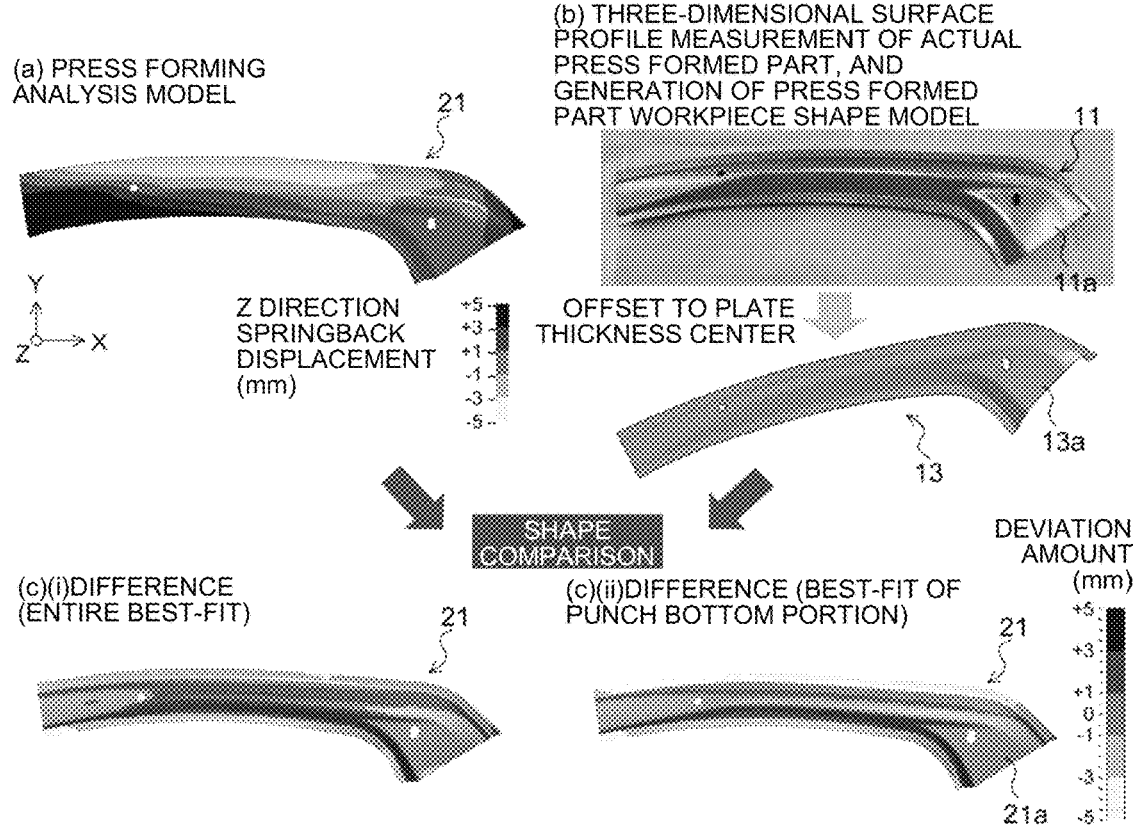

(a) PRESS FORMING ANALYSIS MODEL (b) THREE-DIMENSIONAL SURFACE PROFILE MEASUREMENT OF ACTUAL PRESS FORMED PART, AND GENERATION OF PRESS FORMED PART WORKPIECE SHAPE MODEL

Z DIRECTION SPRINGBACK DISPLACEMENT (mm)

OFFSET TO PLATE THICKNESS CENTER

SHAPE COMPARISON (c)(i)DIFFERENCE (ENTIRE BEST-FIT)

(c)(ii)DIFFERENCE (BEST-FIT OF PUNCH BOTTOM PORTION)

DEVIATION AMOUNT (mm)

FIG.6

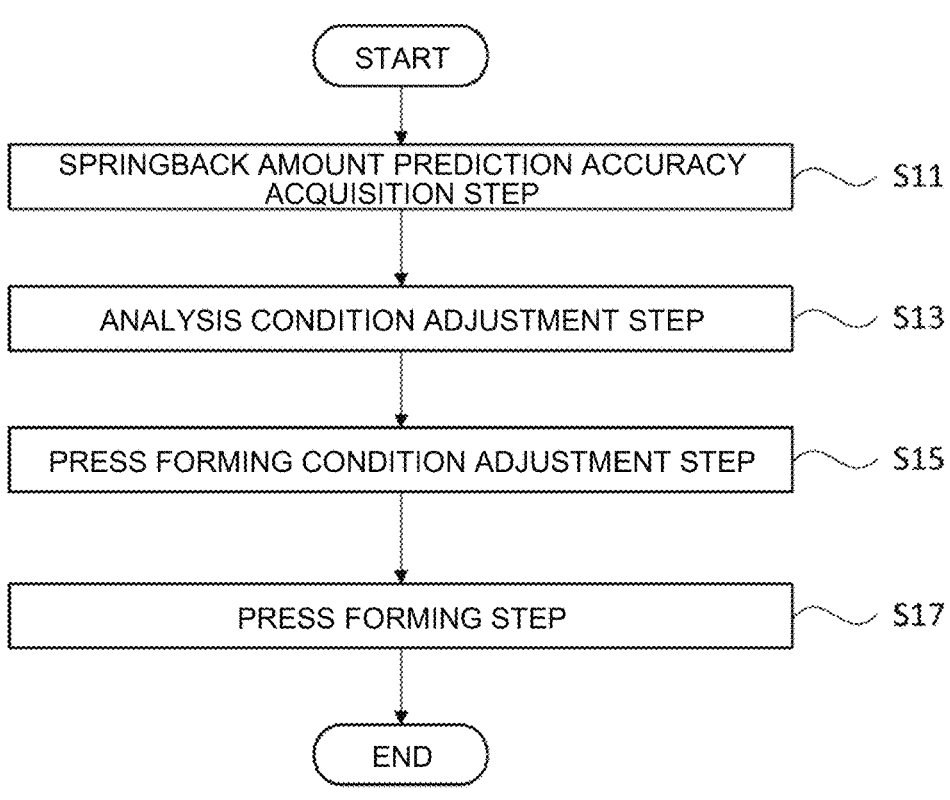

START

SPRINGBACK AMOUNT PREDICTION ACCURACY ACQUISITION STEP    S11

ANALYSIS CONDITION ADJUSTMENT STEP    S13

PRESS FORMING CONDITION ADJUSTMENT STEP    S15

PRESS FORMING STEP    S17

END

FIG.7

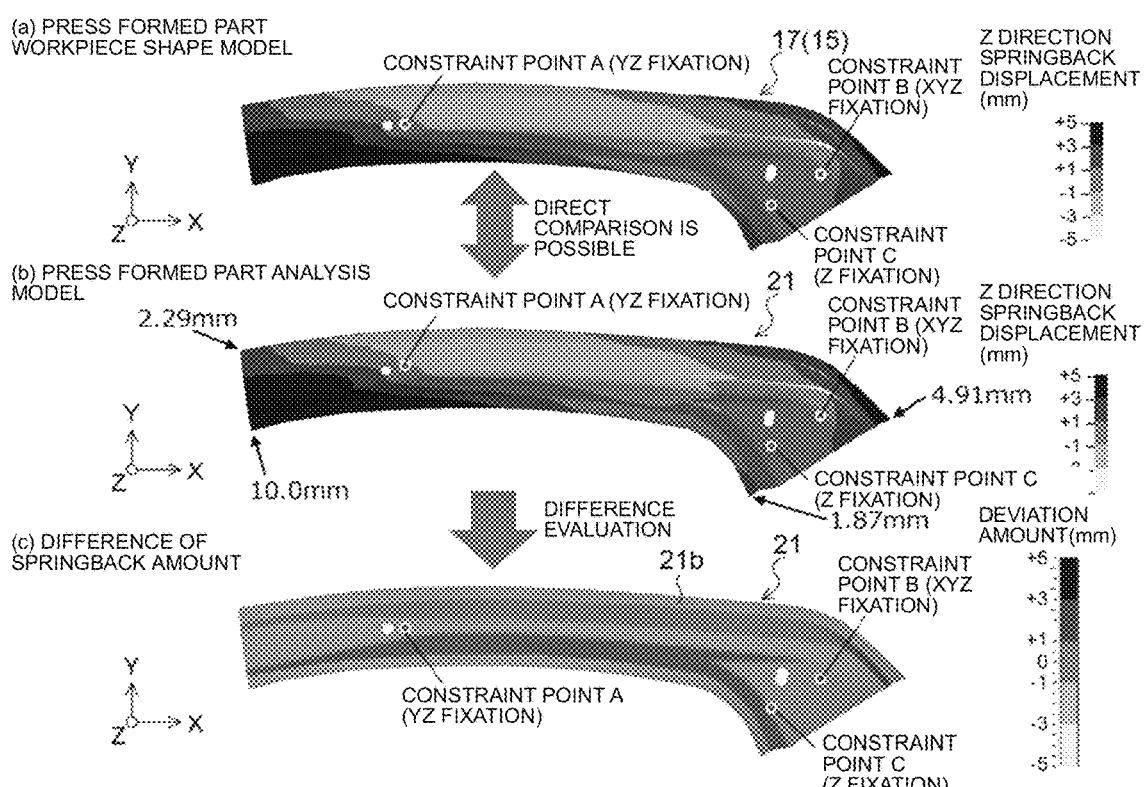

(a) PRESS FORMED PART WORKPIECE SHAPE MODEL

CONSTRAINT POINT A (YZ FIXATION)

17(15)

CONSTRAINT POINT B (XYZ FIXATION)

Z DIRECTION SPRINGBACK DISPLACEMENT (mm)

+5
+3
+1
-1
-3
-5

CONSTRAINT POINT C (Z FIXATION)

DIRECT COMPARISON IS POSSIBLE (b) PRESS FORMED PART ANALYSIS MODEL 2.29mm

CONSTRAINT POINT A (YZ FIXATION)

21

CONSTRAINT POINT B (XYZ FIXATION)

Z DIRECTION SPRINGBACK DISPLACEMENT (mm)

4.91mm 10.0mm

CONSTRAINT POINT C (Z FIXATION)

1.87mm

+5
+3
+1
-1

DIFFERENCE EVALUATION (c) DIFFERENCE OF SPRINGBACK AMOUNT

21b

21

CONSTRAINT POINT B (XYZ FIXATION)

DEVIATION AMOUNT(mm)

+5
+3
+1
0
-1
-3
-5

CONSTRAINT POINT A (YZ FIXATION)

CONSTRAINT POINT C (Z FIXATION)

METHOD, DEVICE, AND PROGRAM OF EVALUATING SPRINGBACK AMOUNT OF PRESS FORMED PART, AND METHOD OF MANUFACTURING PRESS FORMED PART

FIELD

The present invention relates to a method, a device, and a program of evaluating a springback amount of a press formed part by comparing a springback amount of an actual press formed part obtained by actually performing press forming with a springback amount of a press formed part analysis model obtained by performing press forming analysis and evaluating the respective springback amounts thereof. Furthermore, the present invention relates to a method of manufacturing a press formed part, in which the method is performed to manufacture an actual press formed part having improved dimensional accuracy by adjusting a press forming condition so as to reduce a springback amount and actually performing press forming.

BACKGROUND

In press forming of a metal sheet, high dimensional accuracy is required for a press formed part. However, in the press forming, elastic shape recovery of the press formed part, that is, springback occurs at a stage in which the metal sheet is press-formed to the forming bottom dead center with a tool of press forming/a press forming die, the press formed part is taken out from the tool of press forming/the press forming die, and die release is performed. As a result, dimensional accuracy changes from the state of the forming bottom dead center, and this change often causes a dimensional accuracy defect. Therefore, in order to prevent the dimensional accuracy defect of the press formed part, mechanical analysis including a press forming process using a finite element method and a subsequent springback process is generally performed to predict dimensional accuracy of the press formed part in advance.

In order to evaluate quality of the springback amount obtained by such prediction of dimensional accuracy of the press formed part, it is necessary to perform verification by shape comparison between shape data obtained by measurement of a three-dimensional surface profile of an actual press formed part and shape data of a press formed part obtained by mechanical analysis. In order to perform the shape comparison between the press formed parts using these pieces of shape data, first, alignment of the pieces of shape data is essential.

As a method of aligning pieces of shape data of an object, a method called a best-fit in which one piece of shape data is used as a reference, and the other piece of shape data is moved to a position at which a relative distance with the one piece of shape data is minimized by performing parallel movement and/or rotational movement (refer to, for example, Non Patent Literature 1). Then, in the best-fit, there are two types of methods, that is, a method of minimizing a relative distance of the entire shape data and a method of minimizing a relative distance of a part of the shape data, and these methods in alignment are selectively used depending on the purpose of comparison.

In addition, Non Patent Literature 2 discloses a method of aligning both pieces of shape data by setting a plurality of reference points in one piece of shape data and performing parallel movement of the other piece of shape data or rotational movement thereof according to the reference points.

CITATION LIST

Non Patent Literature

Non Patent Literature 1: Isamu Matsuura, High Precise Three-dimensional Best-fit of Curved Surface Shape, Research Direction of Aichi Center for Industry and Science Technology 2012, p. 22

Non Patent Literature 2: Handbook of Difficulty in Press Forming, 3rd edition, edited by Study Group of Thin Steel Sheet Forming Technology, p. 341-342

SUMMARY

Technical Problem

An alignment method of shape data by best-fit is a method having extremely high versatility. However, as illustrated in FIG. 5 as an example, in comparing the shapes of a press formed part analysis model 21 obtained by performing mechanical analysis on an actual press formed part 11 and three-dimensional surface profile measurement data 13 of the actual press formed part 11, (i) a best-fit with the entire actual press formed part 11 and (ii) a best-fit of a punch bottom portion 21a of the press formed part analysis model 21 with a punch bottom portion 13a (corresponding to a punch bottom portion 11a of the actual press formed part 11) in the three-dimensional surface profile measurement data 13 of the actual press formed part 11 are completely different from each other in a deviation amount of the press formed part analysis model 21 from the three-dimensional surface profile measurement data 13, as illustrated in FIG. 5(c).

Then, it is difficult to determine whether a factor of a difference in shape between the press formed part analysis model 21 and the three-dimensional surface profile measurement data 13 is torsion caused by springback of the actual press formed part 11 or a difference in bending angle of a ridge line section of the actual press formed part 11, and it is difficult to determine which part of the actual press formed part 11 has a different shape. In particular, in a case where the two pieces of shape data are significantly different from each other as a whole, that is, in a case where the shape of the press formed part predicted by the mechanical analysis and the shape of the actual press formed part significantly deviate from each other, it is extremely difficult to clarify the factor of the difference between the shapes.

Therefore, also in comparison between a springback amount calculated by the press formed part analysis model 21 and a springback amount of the actual press formed part 11, a deviation amount therebetween varies depending on a difference in a best-fit portion, and thus the springback amount calculated by the press formed part analysis model could not be evaluated with high accuracy.

Further, in a method of setting a reference point in the actual press formed part 11 and aligning the two pieces of shape data, strict alignment is impossible when the relative positions of the plurality of set reference points are different from each other between both pieces of shape data. Furthermore, since the relative positions of the plurality of reference points are different, the plurality of reference points need to be set close to each other, and in a case where a shape difference between both pieces of shape data in a region including these reference points is large, there is a risk that an overall difference in shape data is made larger than an actual difference. Therefore, even when alignment is performed by setting the reference point in the actual press formed part 11, there is a case in which a deviation occurs between the springback amount of the press formed part analysis model 21 obtained by mechanical analysis and the springback amount of the actual press formed part 11. Therefore, it is not possible to appropriately compare the respective springback amounts and, as such, it is difficult to evaluate each of the springback amounts.

Furthermore, since it is difficult to appropriately evaluate the springback amount of the press formed part analysis model 21, it is also difficult to improve prediction accuracy of the springback amount of the press formed part analysis model 21. Therefore, there is a problem that the springback amount cannot be sufficiently reduced even if press forming is performed on the actual press formed part 11 by adjusting a press forming condition based on the springback amount of the press formed part analysis model 21 having low prediction accuracy.

The present invention has been made to solve the above-described problems, and an object of the present invention is to provide a method, a device, and a program of evaluating a springback amount of a press formed part capable of appropriately comparing a springback amount of an actual press formed part spring-backed by actual press forming with a springback amount of a press formed part analysis model acquired by elasto-plastic mechanical analysis including a process of press forming the actual press formed part and a springback process, and capable of evaluating the respective springback amounts. Another object of the present invention is to provide a method of manufacturing a press formed part, in which the method is performed to manufacture an actual press formed part having improved dimensional accuracy obtained by improving prediction accuracy based on evaluation of a springback amount of a press formed part analysis model and then adjusting a press forming condition so as to reduce the springback amount.

Solution to Problem

A method according to the present invention evaluates a springback amount of a press formed part by comparing a springback amount of an actual press formed part obtained by actually press forming a blank using a press forming die with a springback amount of a press formed part analysis model obtained by elasto-plastic mechanical analysis including a process of press forming the actual press formed part and evaluating each of the springback amounts, and includes: a press formed part workpiece shape model acquisition step of generating a press formed part workpiece shape model from three-dimensional surface profile measurement data acquired by measuring a surface profile of the actual press formed part after die release of the actual press formed part and springback thereof, performing elastic mechanical analysis including a process of sandwiching the press formed part workpiece shape model up to a forming bottom dead center by a press forming die model of the press forming die, and acquiring the press formed part workpiece shape model at the forming bottom dead center; an actual press formed part springback amount calculation step of performing spring-back analysis by giving a predetermined constraint condition to the acquired press formed part workpiece shape model at the forming bottom dead center and calculating a springback amount generated in the press formed part workpiece shape model as the springback amount of the actual press formed part; a press formed part analysis model acquisition step of performing the elasto-plastic mechanical analysis including a process of press forming a blank model of the blank by the press forming die model over a single process or a plurality of processes and acquiring the press formed part analysis model at the forming bottom dead center; a press formed part analysis model springback amount calculation step of performing the spring-back analysis by giving, to the press formed part analysis model at the forming bottom dead center, the same constraint condition as the predetermined constraint condition given to the press formed part workpiece shape model in the actual press formed part springback amount calculation step, and calculating the springback amount generated in the press formed part analysis model; and a springback amount comparison/evaluation step of comparing the springback amount of the actual press formed part calculated in the actual press formed part springback amount calculation step with the springback amount of the press formed part analysis model calculated in the press formed part analysis model springback amount calculation step and evaluating each of the springback amounts.

The elastic mechanical analysis in the actual press formed part springback amount calculation step may be elastic finite element analysis, and the elasto-plastic mechanical analysis in the press formed part analysis model acquisition step may be elasto-plastic finite element analysis.

When the process of press forming the actual press formed part is divided for respective portions of the actual press formed part, the press forming die model in the actual press formed part springback amount calculation step may be formed as one press forming die model obtained by synthesizing press forming die models of respective press forming dies adopted to press-form the respective portions of the actual press formed part.

A device according to the present invention evaluates a springback amount of a press formed part by comparing a springback amount of an actual press formed part obtained by actually press forming a blank using a press forming die with a springback amount of a press formed part analysis model obtained by elasto-plastic mechanical analysis including a process of press forming the actual press formed part and evaluating each of the springback amounts, and includes: a press formed part workpiece shape model acquisition unit configured to generate a press formed part workpiece shape model from three-dimensional surface profile measurement data acquired by measuring a surface profile of the actual press formed part after die release of the actual press formed part and springback thereof, perform elastic mechanical analysis including a process of sandwiching the press formed part workpiece shape model up to a forming bottom dead center by a press forming die model of the press forming die, and acquire the press formed part workpiece shape model at the forming bottom dead center; an actual press formed part springback amount calculation unit configured to perform spring-back analysis by giving a predetermined constraint condition to the press formed part workpiece shape model at the acquired forming bottom dead center, and calculate a springback amount generated in the press formed part workpiece shape model as the springback amount of the actual press formed part; a press formed part analysis model acquisition unit configured to perform the elasto-plastic mechanical analysis including a process of press forming a blank model of the blank by the press forming die model over a single process or a plurality of processes, and acquire the press formed part analysis model at the forming bottom dead center; a press formed part analysis model springback amount calculation unit configured to perform the spring-back analysis by giving, to the press formed part analysis model at the forming bottom dead center, a same constraint condition as the predetermined constraint condition given to the press formed part workpiece shape model by the actual press formed part spring-back amount calculation unit, and calculate the springback amount generated in the press formed part analysis model; and a springback amount comparison/evaluation unit configured to compare the springback amount of the actual press formed part calculated in the actual press formed part springback amount calculation unit with the springback amount of the press formed part analysis model calculated by the press formed part analysis model springback amount calculation unit, and evaluate each of the springback amounts.

A program according to the present invention evaluates a springback amount of a press formed part by comparing a springback amount of an actual press formed part obtained by actually press forming a blank using a press forming die with a springback amount of a press formed part analysis model obtained by elasto-plastic mechanical analysis including a process of press forming the actual press formed part and evaluating each of the springback amounts, and causes a computer to function as: a press formed part workpiece shape model acquisition unit configured to generate a press formed part workpiece shape model from three-dimensional surface profile measurement data acquired by measuring a surface profile of the actual press formed part after die release of the actual press formed part and springback thereof, perform elastic mechanical analysis including a process of sandwiching the press formed part workpiece shape model up to a forming bottom dead center by a press forming die model of the press forming die, and acquire the press formed part workpiece shape model at the forming bottom dead center; an actual press formed part springback amount calculation unit configured to perform spring-back analysis by giving a predetermined constraint condition to the press formed part workpiece shape model at the acquired forming bottom dead center, and calculate a springback amount generated in the press formed part workpiece shape model as the springback amount of the actual press formed part; a press formed part analysis model acquisition unit configured to perform the elasto-plastic mechanical analysis including a process of press forming a blank model of the blank by the press forming die model over a single process or a plurality of processes, and acquire the press formed part analysis model at the forming bottom dead center; a press formed part analysis model springback amount calculation unit configured to perform the spring-back analysis by giving, to the press formed part analysis model at the forming bottom dead center, a same constraint condition as the predetermined constraint condition given to the press formed part workpiece shape model by the actual press formed part springback amount calculation unit, and calculate the springback amount generated in the press formed part analysis model; and springback amount comparison/evaluation unit configured to compare the springback amount of the actual press formed part calculated in the actual press formed part springback amount calculation unit with the springback amount of the press formed part analysis model calculated by the press formed part analysis model springback amount calculation unit, and evaluate each of the springback amounts.

A method of manufacturing a press formed part according to the present invention is performed to manufacture an actual press formed part having improved dimensional accuracy obtained by adjusting a press forming condition so as to reduce a springback amount and includes: a springback amount prediction accuracy acquisition step of acquiring, as prediction accuracy of a springback amount of a press formed part analysis model, a difference between a springback amount after die release of the actual press formed part obtained by actually press forming a blank using a press forming die and the springback amount of the press formed part analysis model obtained by mechanical analysis including a process of press forming the actual press formed part and a subsequent springback process based on the method of evaluating the springback amount of the press formed part according to the present invention; an analysis condition adjustment step of adjusting an analysis condition of the press formed part analysis model in the mechanical analysis including the process of press forming the actual press formed part and the subsequent springback process so as to improve the acquired prediction accuracy of the springback amount of the press formed part analysis model; a press forming condition adjustment step of adjusting the press forming condition in the mechanical analysis including the process of press forming the actual press formed part so as to allow the springback amount of the press formed part analysis model obtained under the adjusted analysis condition to fall within a predetermined range; and a press forming step of actually press forming the actual press formed part using the press forming die under the press forming condition adjusted in the press forming condition adjustment step.

Advantageous Effects of Invention

In the present invention, a press formed part workpiece shape model generated based on a three-dimensional surface profile of an actual press formed part obtained by actually performing press forming and a press formed part analysis model obtained by elasto-plastic mechanical analysis including a process of press forming the actual press formed part are aligned at the forming bottom dead center of the same press forming die model, thereby calculating a springback amount. Therefore, the springback amount of the press formed part workpiece shape model calculated as the springback amount of the actual press formed part and the springback amount of the press formed part analysis model can be compared under the same condition, and each of the springback amounts can be evaluated. Based on a difference between the springback amount of the actual press formed part and the springback amount of the press formed forming analysis model, prediction accuracy of dimensional accuracy of the press formed part can be enhanced by adjusting an analysis condition and the like in mechanical analysis including a press forming process using a finite element method and a subsequent springback process, thereby making it possible to prevent a dimensional accuracy defect of the press formed part.

Further, in the present invention, the analysis condition of the mechanical analysis is adjusted so as to enhance prediction accuracy based on the springback amount of the press formed part analysis model evaluated as described above. Subsequently, mechanical analysis including a process of performing press forming under the adjusted analysis condition is performed, and the press forming condition is adjusted so as to reduce the springback amount of the press formed part analysis model. The actual press formed part having improved dimensional accuracy can be manufactured by actually press forming the actual press formed part using the press forming die under the adjusted press forming condition. Further, according to the present invention, it is possible to satisfy allowable dimensional accuracy of the actual press formed part after springback without repeating adjustment of the die shape and the like many times. As a result, the cost and period of preparation for production of the actual press formed part can be significantly reduced.

BRIEF DESCRIPTION OF DRAWINGS

FIG. 1 is a flowchart illustrating a flow of processing of a method of evaluating a springback amount of a press formed part according to a first embodiment of the present invention.

FIG. 3 is a contour diagram illustrating (a) a springback amount calculated using the press formed part workpiece shape model of the actual press formed part, (b) a springback amount of a press formed part analysis model acquired by press forming analysis, and (c) a difference between the springback amount of the press formed part analysis model and the springback amount of the press formed part workpiece shape model, calculated by the method of evaluating the springback amount of the press formed part according to the first embodiment of the present invention.

FIG. 4 is a block diagram of a device of evaluating the springback amount of the press formed part according to the first embodiment of the present invention, and a diagram illustrating a function of a program of evaluating the spring-back amount of the press formed part according to the first embodiment of the present invention.

FIG. 5 is a diagram illustrating (a) the springback amount of the press formed part analysis model acquired by press forming analysis, (b) three-dimensional surface profile measurement data of the press formed part, and (c) deviation amounts ((i) and (ii)) of the press formed part analysis model from the three-dimensional surface profile measurement data of the press formed part, calculated by a conventional method of evaluating the springback amount of the press formed part.

FIG. 6 is a flowchart illustrating a flow of processing in a method of manufacturing a press formed part according to a second embodiment of the present invention.

FIG. 7 is a contour diagram illustrating (a) a springback amount of a press formed part workpiece shape model calculated as a springback amount of an actual press formed part, (b) a springback amount calculated using a press formed part analysis model under an analysis condition adjusted to improve prediction accuracy of the springback amount, and (c) a difference between the springback amount of the press formed part workpiece shape model and the springback amount of the press formed part analysis model, in the method of manufacturing the press formed part according to the second embodiment of the present invention.

DESCRIPTION OF EMBODIMENTS

First Embodiment

Figure 2:
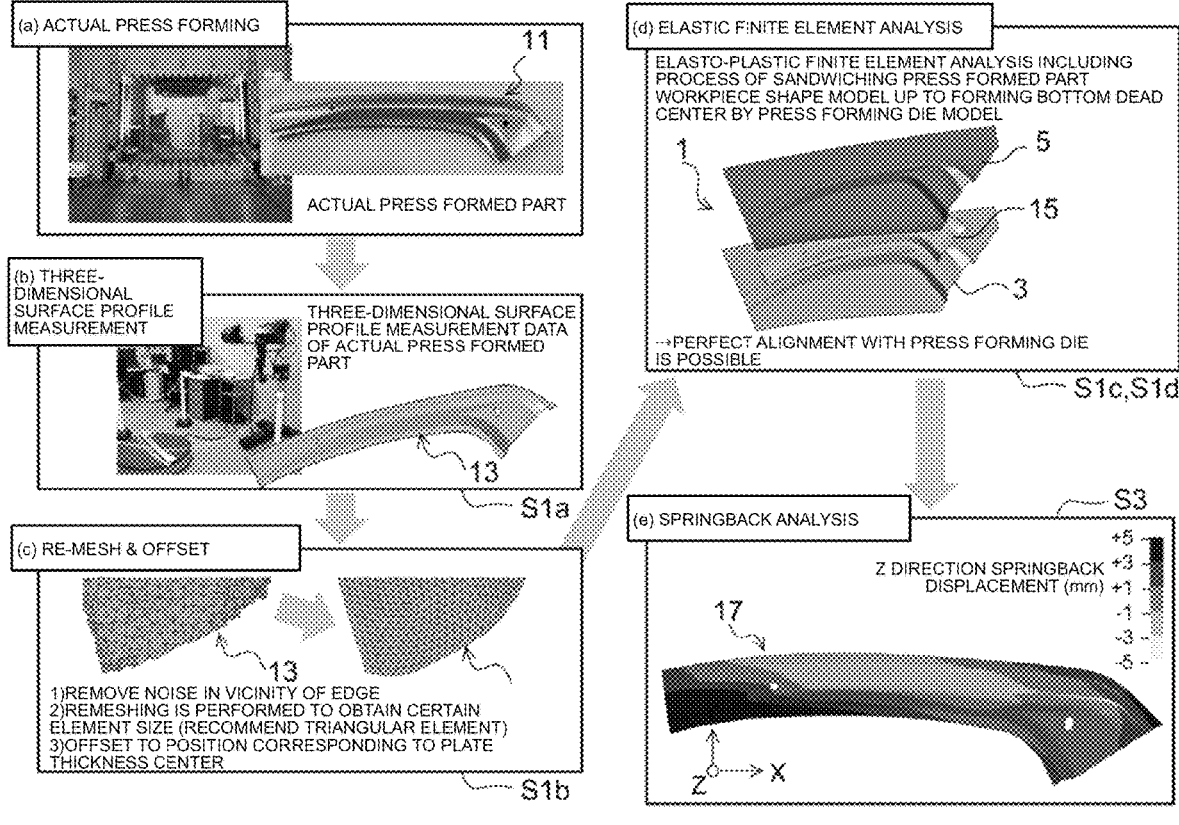
FIG. 2 is a diagram illustrating a process of calculating a springback amount generated in an actual press formed part in the method of evaluating the springback amount of the press formed part according to the first embodiment of the present invention ((a) a press forming step of the actual press formed part, (b) three-dimensional surface profile measurement of the press formed part, (c) conversion of three-dimensional surface profile data into a press formed part workpiece shape model (remeshing and offset), (d) elastic finite element analysis, and (e) spring-back analysis).

Hereinafter, a method, a device, and a program of evaluating a springback amount of a press formed part according to a first embodiment of the present invention will be described with reference to FIGS. 1 to 4. In the first embodiment, as an example, an actual press formed part 11 having a hat-shaped cross section simulating a front pillar upper of an automobile illustrated in FIG. 2 is used. The actual press formed part 11 is obtained by press forming a cold rolled steel sheet having a class of 980 MPa (MPa-class) and a sheet thickness of 1.4 mm. In addition, X, Y, and Z in FIGS. 2, 3, and 5 of the present application respectively indicate the longitudinal direction (X direction), the width direction (Y direction), and the height direction (Z direction) of the actual press formed part 11, three-dimensional surface profile measurement data 13, press formed part workpiece shape models 15 and 17, and a press formed part analysis model 21.

<Method of Evaluating Springback Amount of Press Formed Part>

As illustrated in FIG. 2(a) as an example, the method of evaluating the springback amount of the press formed part according to the first embodiment of the present invention includes obtaining the springback amount of the actual press formed part 11 obtained by actually press forming a blank using a press forming die, as illustrated in FIGS. 2(d) to 2(e) as an example, comparing the obtained springback amount with the springback amount of the press formed part analysis model 21 obtained by elasto-plastic mechanical analysis including a process of press forming the actual press formed part 11, and evaluating each of the springback amounts. As illustrated in FIG. 1, the method of evaluating the spring-back amount of the press formed part includes a press formed part workpiece shape model acquisition step S1, an actual press formed part springback amount calculation step S3, a press formed part analysis model acquisition step S5, a press formed part analysis model springback amount calculation step S7, and a springback amount comparison/evaluation step S9. Each of the above steps will be described below.

<<Press Formed Part Workpiece Shape Model Acquisition Step>>

As illustrated in FIGS. 1 and 2, the press formed part workpiece shape model acquisition step S1 is a step of generating the press formed part workpiece shape model 15 from the three-dimensional surface profile measurement data 13 acquired by measuring a surface profile after die release of the actual press formed part 11 that is actually press-formed and springback thereof are performed, performing elastic mechanical analysis including a process of sandwiching the press formed part workpiece shape model 15 up to the forming bottom dead center by a press forming die model 1 of the press forming die used for the actual press forming, and acquiring the press formed part workpiece shape model 17 at the forming bottom dead center.

In the press formed part workpiece shape model acquisition step S1, first, as illustrated in FIGS. 1 and 2(b), the three-dimensional surface profile measurement data 13 is acquired by measuring the surface profile of the actual press formed part 11 (S1a). Next, in order to treat the acquired three-dimensional surface profile measurement data 13 as a shell element of the elastic mechanical analysis, as illustrated in FIG. 2(c), remeshing is performed to obtain an element (for example, a triangular element) having a certain element size, and then offset is performed with respect to a position corresponding to the plate thickness center, thereby generating the press formed part workpiece shape model 15 (S1b). As necessary, in the three-dimensional surface profile measurement data 13, an operation of removing noise in the vicinity of an edge (contour) may be performed. Instead of treating the three-dimensional surface profile measurement data as a shell element in the elastic mechanical analysis, a method of acquiring the three-dimensional surface profile measurement data by offsetting the acquired three-dimensional surface profile measurement data to the back surface side by the plate thickness, or acquiring the three-dimensional surface profile measurement data of the front and back surfaces by measuring the three-dimensional surface profile measurement data of each of the front surface side and the back surface side, and dividing a three-dimensional space sandwiched between the pieces of three-dimensional surface profile measurement data of the front and back surfaces into solid elements may be used.

Next, the press formed part workpiece shape model 15 is disposed at a position where the press formed part workpiece shape model 15 can be sandwiched by a press forming die model (Sc). At this time, the positioning of the press formed part workpiece shape model 15 may be roughly manually adjusted so that the press formed part workpiece shape model 15 does not significantly deviate in the process of being sandwiched up to the forming bottom dead center by the press forming die model 1.

Specifically, parallel movement and/or rotational movement is performed so that a characteristic shape portion of the press formed part workpiece shape model 15 does not deviate when the press formed part workpiece shape model 15 is sandwiched by the press forming die model 1 using a ridge line section shape, an outer peripheral shape, and a characteristic shape such as a positioning hole/pin of the press formed part workpiece shape model 15 and the press forming die model 1 as a mark. Alternatively, the press formed part workpiece shape model 15 may be once automatically aligned by a best-fit or the like with reference to a lower die model 3 of the press forming die model 1, and then parallel movement of an upper die model 5 may be performed in the press forming direction up to a position at which the upper die model 5 is not in contact with the lower die model 3.

Next, elastic mechanical analysis including the process of sandwiching the press formed part workpiece shape model 15 by the press forming die model 1 is performed (S1*d*), and the press formed part workpiece shape model 17 at the forming bottom dead center is acquired.

The reason for performing the elastic mechanical analysis in the press formed part workpiece shape model acquisition step S1 is described as follows. This is because the press formed part workpiece shape model 17 at the forming bottom dead center acquired by being sandwiched by the press forming die model 1 is returned to the shape of the press formed part workpiece shape model 15 before being sandwiched by the press forming die model 1 by the spring-back analysis in the next actual press formed part springback amount calculation step S3 so as to appropriately calculate the springback amount. In the first embodiment, elastic finite element analysis is performed as the elastic mechanical analysis in the press formed part workpiece shape model acquisition step S1 (FIG. 2(*d*), S1*d*).

As described above, by performing the elastic finite element analysis including the process of sandwiching the press formed part workpiece shape model 15 up to the forming bottom dead center by the press forming die model 1, it is possible to align the press formed part workpiece shape model 15 with the press forming die model 1 as a reference.

Further, the first embodiment is directed to a case in which the actual press formed part 11 is subjected to crash forming by the press forming die including a lower die and an upper die, but in the case of deep drawing, a cushion (blank holder) for sandwiching a blank in cooperation with the upper die is provided in the press forming die. In this case, the press forming die model includes a cushion model (not illustrated), the cushion model is disposed at the forming bottom dead center position from the beginning, and a process of sandwiching the press formed part workpiece shape model between the lower die model and the upper die model may be analyzed.

<<Actual Press Formed Part Springback Amount Calculation Step>>

As illustrated in FIGS. 1 and 2(*e*), the actual press formed part springback amount calculation step S3 is a step of giving a predetermined constraint condition to the press formed part workpiece shape model 17 at the forming bottom dead center acquired in the press formed part workpiece shape model acquisition step S1 (S3*a*), performing spring-back analysis (S3*b*), and calculating the springback amount generated in the press formed part workpiece shape model 17 as the springback amount of the actual press formed part 11.

The reason why the constraint condition is given to the press formed part workpiece shape model 17 in the springback analysis in the actual press formed part springback amount calculation step S3 is described with the following two reasons.

First, the first reason is a measure necessary for obtaining a dynamically stable solution, and is to prevent a plurality of solutions from being generated by providing a constraint condition in the translation direction and the rotation direction of the press formed part workpiece shape model 17.

The second reason is to set a reference portion in evaluating accuracy of the dimension and shape of the press formed part workpiece shape model 17. Therefore, a predetermined constraint condition given in the actual press formed part springback amount calculation step S3 may be appropriately set according to the use of each press formed part and the quality evaluation criteria on the premise that the plurality of solutions described above for the first reason are not generated.

Typical examples of the predetermined constraint condition include (1) a condition for giving a constraint in the translation and rotation directions to one point or a plurality of points inside or around a reference shape (a hole or a bearing surface) on a certain reference area, for example, a blank (press formed part) set for positioning in a press forming die of the blank, and (2) a condition for giving three-way fixation, two-way fixation, or one-way fixation among translation directions of a three-dimensional space to three distant points on the press formed part.

In the first embodiment, as illustrated in FIG. 3(*a*), three constraint points including a constraint point A, a constraint point B, and a constraint point C are set in the press formed part workpiece shape model 15, a condition (hereinafter, referred to as "YZ fixation") for giving a constraint in the translation and rotation directions of the Y direction and the Z direction is provided for the constraint point A, a condition (hereinafter, referred to as "XYZ fixation") for giving a constraint in the translation and rotation directions of the X direction, the Y direction, and the Z direction is provided for the constraint point B, and a condition (hereinafter, referred to as "Z fixation") for giving a constraint in the translation and rotation directions of the Z direction is provided for the constraint point C.

Further, in the first embodiment, the elastic finite element analysis is performed as the spring-back analysis in the actual press formed part springback amount calculation step S3.

<<Press Formed Part Analysis Model Acquisition Step>>

As illustrated in FIG. 1, the press formed part analysis model acquisition step S5 is a step of performing elasto-plastic mechanical analysis including a process of press forming a blank model of a blank used for actual press forming by the press forming die model 1 so as to acquire the press formed part analysis model 21 at the forming bottom dead center (S5a).

In the first embodiment, in the press formed part analysis model acquisition step S5, elasto-plastic finite element analysis is performed as the elasto-plastic mechanical analysis.

In the first embodiment, before executing the press formed part analysis model acquisition step S5, a blank model (not illustrated) used for press forming analysis of the press formed part analysis model 21 and the press forming die model 1 (FIG. 2(d)) are acquired in advance.

<<Press Formed Part Analysis Model Springback Amount Calculation Step>>

As illustrated in FIG. 1, the press formed part analysis model springback amount calculation step S7 is a step of giving the same constraint condition as that given to the press formed part workpiece shape model 17 in the actual press formed part springback amount calculation step S3 to the press formed part analysis model 21 at the forming bottom dead center (S7a), performing spring-back analysis (S7b), and calculating the springback amount generated in the press formed part analysis model 21.

In the first embodiment, similarly to the constraint condition (FIG. 3(a)) set in the press formed part workpiece shape model 15, as illustrated in FIG. 3(b), three constraint points including the constraint point A, the constraint point B, and the constraint point C are set in the press formed part analysis model 21, and the constraint conditions of YZ fixation for the constraint point A, XYZ fixation for the constraint point B, and Z fixation for the constraint point C are given.

In the first embodiment, the elastic finite element analysis is performed as the spring-back analysis in the press formed part analysis model springback amount calculation step S7, but the elasto-plastic finite element analysis may be performed.

<<Springback Amount Comparison/Evaluation Step>>

As illustrated in FIG. 1, the springback amount comparison/evaluation step S9 is a step of comparing the springback amount of the actual press formed part 11 calculated in the actual press formed part springback amount calculation step S3 with the springback amount of the press formed part analysis model 21 calculated in the press formed part analysis model springback amount calculation step S7 and evaluating each of the springback amounts.

In the first embodiment, the springback amount of the press formed part analysis model 21 was evaluated based on the springback amount of the actual press formed part 11. FIG. 3(c) illustrates a result of a deviation amount of the springback amount of the press formed part analysis model 21 with reference to the press formed part workpiece shape model 17 calculated as the springback amount of the actual press formed part 11. The deviation amount illustrated in FIG. 3(c) indicates a distribution of the deviation amount in the z direction (press forming die stroke direction) of the press formed part analysis model 21. In the calculation of the deviation amount, new alignment is not performed. From the result of the deviation amount illustrated in FIG. 3(c), it can be seen that the springback amount in the press formed part analysis model 21 by the elasto-plastic finite element analysis deviates in the negative direction (−z direction) of the height direction in an entire flange portion 21b as compared with the springback amount of the actual press formed part 11.

As described above, in the method of evaluating the springback amount of the press formed part according to the first embodiment, both the press formed part workpiece shape model 17 calculated as the springback amount of the actual press formed part 11 and the press formed part analysis model 21 are aligned by the same press forming die model 1. Therefore, the springback amount of the press formed part analysis model 21 can be compared and evaluated under the same condition based on the springback amount of the actual press formed part 11. As a result, analysis accuracy of the springback amount of the press formed part analysis model 21 can be evaluated. The same condition indicates that the spring-back analysis of the press formed part workpiece shape model 17 and the spring-back analysis of the press formed part analysis model 21 have the same constraint condition. This is because when the constraint conditions are different from each other, a difference occurs in the springback amount by the spring-back analysis.

Further, the above description refers to a case in which the springback amount of the press formed part analysis model 21 is evaluated based on the springback amount of the actual press formed part 11, but the present invention may compare the springback amount of the actual press formed part 11 based on the springback amount of the press formed part analysis model 21. By comparing the springback amount of the actual press formed part 11, the springback amount of the actual press formed part 11 can be evaluated under the same condition as the springback amount of the press formed part analysis model 21. Based on the difference between the springback amount of the actual press formed part 11 and the springback amount of the press formed part analysis model 21, the analysis condition and the like in the mechanical analysis including the press forming process using the finite element method and the subsequent springback process can be adjusted to improve the prediction accuracy of the dimensional accuracy of the press formed part, thereby making it possible to prevent a dimensional accuracy defect of the press formed part.

<Device of Evaluating Springback Amount of Press Formed Part>

As illustrated in FIG. 2(a) as an example, a device 31 of evaluating the springback amount of the press formed part according to the first embodiment of the present invention (hereinafter, referred to as a "springback amount evaluation device 31") compares the springback amount of the actual press formed part 11 obtained by actually press forming a blank using a press forming die with the springback amount of the press formed part analysis model 21 obtained by elasto-plastic mechanical analysis including the process of press forming the actual press formed part 11, and evaluates each of the springback amounts. As illustrated in FIG. 4, the springback amount evaluation device 31 includes a press formed part workpiece shape model acquisition unit 33, an actual press formed part springback amount calculation unit 35, a press formed part analysis model acquisition unit 37, a press formed part analysis model springback amount calculation unit 39, and a springback amount comparison/evaluation unit 41. The springback amount evaluation device 31 may be configured by a central processing unit (CPU) of a computer (PC or the like). In this case, each of the above units functions when the CPU of the computer executes a predetermined program.

<<Press Formed Part Workpiece Shape Model Acquisition Unit>>

As illustrated in FIGS. 2 and 4, the press formed part workpiece shape model acquisition unit 33 generates the press formed part workpiece shape model 15 from the three-dimensional surface profile measurement data 13 acquired by measuring the surface profile after die release of the actual press formed part 11 that is actually press-formed and springback thereof are performed, performs the elastic mechanical analysis including the process of sandwiching the press formed part workpiece shape model 15 up to the forming bottom dead center by the press forming die model 1 of the press forming die used for the actual press forming, and acquires the press formed part workpiece shape model 17 at the forming bottom dead center.

In the first embodiment, the press formed part workpiece shape model acquisition unit 33 executes the press formed part workpiece shape model acquisition step S1 in the method of evaluating the springback amount of the press formed part described above.

When the press formed part workpiece shape model 15 generated from the three-dimensional surface profile measurement data 13 by the press formed part workpiece shape model acquisition unit 33 is set in the press forming die model 1, an operator may roughly manually adjust the positioning so that the press formed part workpiece shape model 15 does not significantly deviate in the process of sandwiching the press formed part workpiece shape model 15 up to the forming bottom dead center by the press forming die model 1.

Alternatively, the press formed part workpiece shape model 15 may be once automatically aligned by a best-fit or the like with reference to the lower die model 3 of the press forming die model 1, and subsequently the operator may manually perform parallel movement of the press formed part workpiece shape model 15 up to a position at which the upper die model 5 is not in contact with the lower die model 3 in the press forming direction.

<<Actual Press Formed Part Springback Amount Calculation Unit>>

The actual press formed part springback amount calculation unit 35 gives a predetermined constraint condition to the press formed part workpiece shape model 17 at the forming bottom dead center acquired by the press formed part workpiece shape model acquisition unit 33 so as to perform spring-back analysis, and calculates the springback amount generated in the press formed part workpiece shape model 17 as the springback amount of the actual press formed part 11 that is actually press-formed.

In the first embodiment, the actual press formed part springback amount calculation unit 35 executes the actual press formed part springback amount calculation step S3 in the method of evaluating the springback amount of the press formed part described above.

<<Press Formed Part Analysis Model Acquisition Unit>>

The press formed part analysis model acquisition unit 37 performs the elasto-plastic mechanical analysis including the process of press forming the blank model of the blank used for actual press forming by the press forming die model 1, and acquires the press formed part analysis model 21 at the forming bottom dead center.

In the first embodiment, the press formed part analysis model acquisition unit 37 executes the press formed part analysis model acquisition step S5 in the method of evaluating the springback amount of the press formed part described above.

<<Press Formed Part Analysis Model Springback Amount Calculation Unit>>

The press formed part analysis model springback amount calculation unit 39 performs spring-back analysis by giving the same constraint condition as the constraint condition given to the press formed part workpiece shape model 17 by the actual press formed part springback amount calculation unit to the press formed part analysis model 21 at the forming bottom dead center, and calculates the springback amount generated in the press formed part analysis model 21.

In the first embodiment, the press formed part analysis model springback amount calculation unit 39 executes the press formed part analysis model springback amount calculation step S7 in the method of evaluating the springback amount of the press formed part described above.

<<Springback Amount Comparison/Evaluation Unit>>

The springback amount comparison/evaluation unit 41 compares the springback amount of the actual press formed part 11 calculated by the actual press formed part springback amount calculation unit 35 with the springback amount of the press formed part analysis model 21 calculated by the press formed part analysis model springback amount calculation unit 39, and evaluates each of the springback amounts.

In the first embodiment, the springback amount comparison/evaluation unit 41 executes the springback amount comparison/evaluation step S9 in the method of evaluating the springback amount of the press formed part described above.

<Program of Evaluating Springback Amount of Press Formed Part>

The first embodiment of the present invention can be configured as a program of evaluating the springback amount of the press formed part. That is, the program of evaluating the springback amount of the press formed part according to the first embodiment of the present invention compares the springback amount of the actual press formed part obtained by actually press forming a blank using a press forming die with the springback amount of the press formed part analysis model obtained by elasto-plastic mechanical analysis including the process of press forming the press formed part, and evaluates each of the springback amounts. As illustrated in FIG. 4, the program of evaluating the springback amount of the press formed part causes a computer to function as the press formed part workpiece shape model acquisition unit 33, the actual press formed part springback amount calculation unit 35, the press formed part analysis model acquisition unit 37, the press formed part analysis model springback amount calculation unit 39, and the springback amount comparison/evaluation unit 41.

As described above, also in the device and the program of evaluating the springback amount of the press formed part according to the first embodiment, similarly to the method of evaluating the springback amount of the press formed part according to the first embodiment described above, the press formed part workpiece shape model 17 and the press formed part analysis model 21, which are calculated as the springback amount of the actual press formed part 11, are aligned in the same press forming die model 1. Therefore, the springback amount of the press formed part analysis model can be compared and evaluated based on the springback amount of the actual press formed part 11. As a result, analysis accuracy of the springback amount of the press formed part analysis model 21 can be evaluated. Furthermore, the device and the program of evaluating the spring-back amount of the press formed part according to the present invention compare the springback amount of the actual press formed part 11 with the springback amount of the press formed part analysis model as a reference, thereby making it possible to evaluate the springback amount of the actual press formed part under the same condition as the springback amount of the press formed part analysis model. According to the present invention, based on the difference between the springback amount of the actual press formed part and the springback amount of the press formed part analysis model, prediction accuracy of dimensional accuracy of the press formed part can be enhanced by adjusting the analysis condition and the like in the mechanical analysis including the press forming process using the finite element method and the subsequent springback process, thereby making it possible to prevent the dimensional accuracy defect of the press formed part.

Second Embodiment

<Method of Manufacturing Press Formed Part>

A method of manufacturing a press formed part according to a second embodiment of the present invention is a method of manufacturing an actual press formed part having improved dimensional accuracy obtained by adjusting a press forming condition so as to reduce a springback amount. As illustrated in FIG. 6, the method of manufacturing the press formed part according to the second embodiment includes a springback amount prediction accuracy acquisition step S11, an analysis condition adjustment step S13, a press forming condition adjustment step S15, and a press forming step S17. Hereinafter, as an example, each of the above steps will be described for the case of manufacturing the actual press formed part 11 illustrated in FIG. 2(*a*).

<<Springback Amount Prediction Accuracy Acquisition Step>>

In the springback amount prediction accuracy acquisition step S11, the springback amount after die release of the actual press formed part 11 in which a blank is actually press formed using a press forming die is obtained by the method of evaluating the springback amount of the press formed part according to the first embodiment described above. Further, in the springback amount prediction accuracy acquisition step S11, the springback amount of the press formed part analysis model 21 is obtained by mechanical analysis including the process of press forming the actual press formed part 11 and the subsequent springback process by the method according to the first embodiment. A difference between the springback amount of the actual press formed part 11 after the die release and the springback amount of the press formed part analysis model 21 is obtained as prediction accuracy of the springback amount of the press formed part analysis model 21.

The springback amount of the actual press formed part 11 after die release can be acquired by performing the press formed part workpiece shape model acquisition step S1 and the actual press formed part springback amount calculation step S3 according to the first embodiment described above (refer to FIG. 3(*a*)). FIG. 3(*a*) is a diagram illustrating the springback amount of the press formed part workpiece shape model 15 (17) obtained as the springback amount of the actual press formed part 11 after die release. The springback amount of the press formed part analysis model 21 can be acquired by performing the press formed part analysis model acquisition step S5 and the press formed part analysis model springback amount calculation step S7 according to the first embodiment (refer to FIG. 3(*b*)).

The springback amount of the press formed part work-piece shape model 17 and the springback amount of the press formed part analysis model 21 acquired as described above are calculated by performing alignment using the same press forming die model 1. Therefore, the springback amount of the press formed part workpiece shape model 17 can be compared with the springback amount of the press formed part analysis model 21, and a difference therebe-tween can be obtained as the prediction accuracy of the springback amount of the press formed part analysis model 21.

The difference in the springback amount between the press formed part workpiece shape model 17 and the press formed part analysis model 21 may be obtained by calcu-lating a deviation amount of the springback amount of the press formed part analysis model 21 with reference to the springback amount of the press formed part workpiece shape model 17.

<<Analysis Condition Adjustment Step>>

The analysis condition adjustment step S13 is a step of adjusting a condition for analysis (hereinafter, referred to as an analysis condition) to be a base of the press formed part analysis model 21 in the mechanical analysis including the process of press forming the actual press formed part 11 and the subsequent springback process so as to improve predic-tion accuracy of the springback amount of the press formed part analysis model 21.

Examples of the analysis condition that affects the pre-diction accuracy of the springback amount of the press formed part analysis model 21 include (i) an FEM analysis condition and (ii) a press forming analysis condition.

(i) The FEM analysis condition is a condition for analysis (analysis condition) serving as a base on the computing techniques related to a numerical analysis method and an approximation method of a model in performing mechanical analysis by the finite element method (FEM) for calculating the springback amount of the press formed part analysis model 21. Examples of the FEM analysis condition include a size of element divisions of a blank, the number of integral points in an element, a finite element type to be selected, and a material constitutive law of a metal material.

(ii) The press forming analysis condition refers to an analysis condition (analysis condition) serving as a calcu-lation base which is a premise in performing mechanical analysis of a process of press forming or a process of springback, and is a physical parameter related to behavior of a blank or a press forming die corresponding to actual press forming. Examples of the press forming analysis condition include a forming bottom dead center position of a press forming die, a friction coefficient between a press forming die and a blank, a clearance of a press forming die (punch and die), and a forming speed of a press forming die.

FIG. 7(*b*) illustrates a result of obtaining the springback amount of the press formed part analysis model 21 under the analysis condition adjusted based on the prediction accuracy of the springback amount of the press formed part analysis model 21 illustrated in FIG. 3(*c*). The result illustrated in FIG. 7(*b*) is obtained by adjusting the FEM analysis condi-tion and the press forming analysis condition as the analysis condition as follows.

With regard to the FEM analysis condition, the average element size of the blank was subdivided from 1.5 mm to 1.2 mm, and the number of integral points in the plate thickness direction was changed from 7 points to 9 points. Further, a material model of the blank was changed from an isotropic hardening material model to a Yoshida-Uemori material model capable of more accurately reproducing the hardening property of a metal material and the elastic behavior during unloading. On the other hand, regarding the press forming analysis condition, the friction coefficient between the press forming die model 1 and the blank, which is the press forming analysis condition, was changed from 0.10 to 0.11 based on a state of deviation in the springback amount between the press formed part analysis model 21 and the actual press formed part 11 in FIG. 3(*c*).

FIG. 7(*c*) illustrates an example of a result of obtaining the prediction accuracy of the springback amount of the press formed part analysis model 21 by adjusting the analysis condition. The result illustrated in FIG. 7(*c*) is obtained by obtaining a deviation amount of the springback amount (FIG. 7(*b*)) of the press formed part analysis model 21 under the analysis condition adjusted as described above with reference to the springback amount (FIG. 7(*a*)) of the press formed part workpiece shape model 17.

As illustrated in FIG. 7(*c*), by adjusting the analysis condition as described above, the prediction accuracy (deviation amount) of the springback amount of the press formed part analysis model 21 was within the range of +1.0 mm over the entire region. As a result, it can be seen that the prediction accuracy of the springback amount of the press formed part analysis model 21 is higher than that before the analysis condition is adjusted (refer to FIG. 3(*c*)).

In the analysis condition adjustment step S13, the analysis condition may be adjusted (changed) as described above to perform mechanical analysis, the prediction accuracy of the springback amount of the press formed part analysis model 21 may be obtained, and the analysis condition may be further adjusted based on the obtained prediction accuracy.

<<Press Forming Condition Adjustment Step>>

The press forming condition adjustment step S15 is a step of adjusting the press forming condition in the mechanical analysis including the process of press forming the actual press formed part 11. In the press forming condition adjustment step S15, the press forming condition is adjusted such that the springback amount of the press formed part analysis model 21 obtained under the analysis condition adjusted in the analysis condition adjustment step S13 falls within a predetermined range.

The adjustment of the press forming condition in the press forming condition adjustment step S15 is performed, for example, according to the following procedures (A) to (D).

(A) Mechanical analysis including the process of press forming the actual press formed part 11 under the analysis condition adjusted in the analysis condition adjustment step S13 and the subsequent process of springback is performed so as to obtain the springback amount of the press formed part analysis model 21. In the mechanical analysis, the adjusted analysis condition is given to the press formed part analysis model 21, and the above-described press formed part analysis model springback amount calculation step S7 may be performed.

(B) It is determined whether the springback amount of the press formed part analysis model 21 obtained by the mechanical analysis falls within a predetermined range.

(C) When it is determined that the springback amount does not fall within the predetermined range, the press forming condition in the mechanical analysis including the process of press forming and the subsequent process of springback is adjusted using the press formed part analysis model 21.

(D) The above (A) to (C) are repeated until the springback amount of the press formed part analysis model 21 obtained under the adjusted press forming condition falls within the predetermined range.

In the press forming condition adjustment step S15, the predetermined range determined in advance so as to allow the springback amount of the press formed part analysis model 21 to fall within the predetermined range may be appropriately set based on, for example, dimensional accuracy allowed for the actual press formed part 11.

Further, in the adjustment of the press forming condition, for example, the shape of the press forming die model 1 (refer to FIG. 2) may be changed so that a forming bottom dead center position of a portion having high springback displacement in the Z direction in the press formed part analysis model 21 is reversely pushed down.

<<Press Forming Step>>

The press forming step S17 is a step of actually press forming a blank using a press forming die under the press forming condition adjusted in the press forming condition adjustment step S15 so as to manufacture the actual press formed part 11.

As described above, in the method of manufacturing the press formed part according to the second embodiment, the analysis condition is adjusted based on the springback amount of the press formed part analysis model 21 obtained by the method according to the first embodiment so as to improve the prediction accuracy. Subsequently, the press forming condition is adjusted so as to reduce the springback amount of the press formed part analysis model 21 obtained under the adjusted analysis condition. By actually press forming the actual press formed part 11 under the adjusted press forming condition, the actual press formed part 11 having improved dimensional accuracy can be manufactured.

By the method of manufacturing the press formed part according to the second embodiment, even when the actual press formed part 11 is press-formed under the press forming condition adjusted so as to reduce the springback amount, the springback amount may not satisfy allowable dimensional accuracy. In this case, further adjustment of the press forming condition such as a die shape used to press forming the actual press formed part 11 may be repeated based on the springback amount of the actual press formed part 11 press-formed under the adjusted press forming condition.

However, in the method according to the second embodiment, since the press forming condition is adjusted so as to reduce the springback amount, the dimensional accuracy allowed for the actual press formed part 11 can be satisfied without repeating the adjustment of the die shape and the like as the press forming condition many times.

As described above, according to the method of manufacturing the press formed part according to the second embodiment, it is also possible to significantly shorten the cost and period of preparation for production of the actual press formed part 11.

The description of the first and second embodiments of the present invention is directed to a case in which the entire actual press formed part 11 is press-formed in a single step. However, in the present invention, the step of press forming the actual press formed part may be divided into a plurality of steps for each portion of the actual press formed part. In this case, in the present invention, the press forming die model used to calculate the springback amount of the press formed part workpiece shape model may be one press forming die model by combining the press forming die models of the respective press forming dies for forming the respective portions of the actual press formed part.

In the analysis of the process of sandwiching the press formed part workpiece shape model in the press forming die model, a press forming die model of a press forming die for forming a part of the actual press formed part may be used. Then, a portion in which the press formed part workpiece shape model is sandwiched by the press forming die model and a portion in a press formed part analysis model corresponding to the portion may be aligned.

In the above description, the forming bottom dead center of the press forming die is assumed to be a time point at which an interval between the lower die and the upper die becomes equal to a plate thickness of the blank. However, in the present invention, the forming bottom dead center includes a case in which the press forming die is stopped right before the forming bottom dead center (5 mm, 10 mm, or the like, within 10 mm), and the actual press formed part formed up to right before the forming bottom dead center may be compared with the press forming analysis model.

Further, in the first embodiment and the second embodiment, the press formed part workpiece shape models 15 and 17 and the press formed part analysis model 21 are both modeled by a shell element (for example, a triangular element), but the present invention may be applicable to models modeled by a solid element.

EXAMPLES

An experiment for verifying the operation and effect of the present invention has been performed, and the experiment will be described below. In an Example, the press forming condition of the actual press formed part 11 illustrated in FIG. 2 was adjusted so as to reduce the springback amount. As in the first embodiment and the second embodiment described above, the actual press formed part 11 simulates a front pillar upper of an automobile, and is obtained by press forming a cold rolled steel sheet having a tensile strength of 980 MPa-class and a sheet thickness of 1.4 mm.

In the experiment, as an invention example, the springback amount prediction accuracy acquisition step S11, the analysis condition adjustment step S13, the press forming condition adjustment step S15, and the press forming step S17 of the second embodiment described above were performed, and the actual press formed part 11 was press-formed. In the invention example, in the press forming condition adjustment step S15, the shape of a press forming die was adjusted as the press forming condition so as to reduce the springback amount of the press formed part analysis model 21. In addition, in the press forming step S17, the press forming die was actually manufactured based on the shape of the press forming die model 1 adjusted for the press formed part analysis model 21, and the actual press formed part 11 was press-formed using the manufactured press forming die. For the press-formed actual press formed part 11, the surface profile after being released from the press forming die and being spring-backed was measured to determine the springback amount.

In the experiment, as a comparative example, the press forming condition adjustment step S15 and the press forming step S17 were performed without performing springback amount prediction accuracy acquisition step S11 and the analysis condition adjustment step S13 according to the second embodiment, and the actual press formed part 11 was press-formed. In the comparative example, the press forming condition adjustment step S15 was performed using the press formed part analysis model 21 in which a deviation from the springback amount of the actual press formed part 11 was still generated, and the press forming condition was adjusted so as to reduce the springback amount of the press formed part analysis model 21.

In the invention example and the comparative example, the press forming condition was adjusted by changing the shape of the press forming die model 1 based on the distribution of the springback amount of the press formed part analysis model 21. Specifically, in the press formed part analysis model 21, the shape of the press forming die model 1 was changed so as to reversely push down the forming bottom dead center positions of portions where springback displacement in the Z direction was higher by +3 to +5 mm by −3 to −5 mm, respectively.

The springback amount of the actual press formed part 11 in each of the invention example and the comparative example was evaluated by a ratio (hereinafter, referred to as "concordance rate of ±0.5 mm") of a projected area on the XY plane in which a deviation amount from a target shape of the actual press formed part in the height direction (Z direction) was within ±0.5 mm.

The concordance rate of ±0.5 mm in the invention example was 91%, whereas the concordance rate of ±0.5 mm in the comparative example was 77%. From this result, it was demonstrated that the dimensional accuracy of the actual press formed part 11 can be improved according to the method of the present invention.

Further, for each of the invention example and the comparative example, the adjustment of the die shape was repeated so that the concordance rate of ±0.5 mm with the target shape of the actual press formed part 11 became 100%. Here, the shape of the press forming die was adjusted so as to approach the target shape by changing the forming bottom dead center position for a portion at which the deviation amount from the target shape in the height direction of the actual press formed part 11 after the springback exceeds ±0.5 mm.

For the actual press formed part 11 according to the invention example, the concordance rate of ±0.5 mm became 100% by adjusting the die shape twice. On the other hand, for the actual press formed part 11 according to the conventional example, the concordance rate of ±0.5 mm became 100% by adjusting the die shape four times. Therefore, according to the method of the present invention, it has been demonstrated that the dimensional accuracy allowed for the actual press formed part can be achieved with a smaller number of times of adjustment of the die shape. This showed that the cost and period of preparation for production of the press formed part can be significantly reduced.

INDUSTRIAL APPLICABILITY

According to the present invention, it is possible to provide a method, a device, and a program of evaluating a springback amount of a press formed part capable of appropriately comparing a springback amount of an actual press formed part spring-backed by actual press forming with a springback amount of a press formed part analysis model acquired by elasto-plastic mechanical analysis including a process of press forming the actual press formed part and a springback process and evaluating each of the springback amounts. Furthermore, according to the present invention, it is possible to provide a method of manufacturing a press formed part, in which the method is performed to manufacture an actual press formed part having improved dimensional accuracy obtained by improving prediction accuracy based on evaluation of a springback amount of a press formed part analysis model and then adjusting a press forming condition so as to reduce the springback amount.

REFERENCE SIGNS LIST

1 PRESS FORMING DIE MODEL
3 LOWER DIE MODEL
5 UPPER DIE MODEL
11 ACTUAL PRESS FORMED PART
11a PUNCH BOTTOM PORTION
13 THREE-DIMENSIONAL SURFACE PROFILE MEASUREMENT DATA
13a PUNCH BOTTOM PORTION
15 PRESS FORMED PART WORKPIECE SHAPE MODEL
17 PRESS FORMED PART WORKPIECE SHAPE MODEL
21 PRESS FORMED PART ANALYSIS MODEL
21a PUNCH BOTTOM PORTION
21b FLANGE PORTION
31 DEVICE OF EVALUATING SPRINGBACK AMOUNT OF PRESS FORMED PART
33 PRESS FORMED PART WORKPIECE SHAPE MODEL ACQUISITION UNIT
35 ACTUAL PRESS FORMED PART SPRINGBACK AMOUNT CALCULATION UNIT
37 PRESS FORMED PART ANALYSIS MODEL ACQUISITION UNIT
39 PRESS FORMED PART ANALYSIS MODEL SPRINGBACK AMOUNT CALCULATION UNIT
41 SPRINGBACK AMOUNT COMPARISON/EVALUATION UNIT

The invention claimed is:

1. A method of determining an adjusted press forming condition for manufacturing an actual press formed part having improved dimensional accuracy using a press forming die, the method comprising:

i. evaluating a springback amount of a press formed part by comparing a springback amount of an actual press formed part obtained by actually press forming a blank using the press forming die with a springback amount of a press formed part analysis model obtained by elasto-plastic mechanical analysis including a process of press forming the actual press formed part and evaluating the springback amounts of the actual press formed part and the press formed part analysis model, the evaluating comprising:

a press formed part workpiece shape model acquisition step of generating a press formed part workpiece shape model from three-dimensional surface profile measurement data acquired by measuring a surface profile of the actual press formed part after die release of the actual press formed part and springback thereof, performing elastic mechanical analysis including a process of sandwiching the press formed part workpiece shape model up to a forming bottom dead center by a press forming die model of the press forming die, and acquiring the press formed part workpiece shape model at the forming bottom dead center;

an actual press formed part springback amount calculation step of performing spring-back analysis by giving a predetermined constraint condition to the acquired press formed part workpiece shape model at the forming bottom dead center and calculating a springback amount generated in the press formed part workpiece shape model as the springback amount of the actual press formed part;

a press formed part analysis model acquisition step of performing the elasto-plastic mechanical analysis including a process of press forming a blank model of the blank by the press forming die model over a single process or a plurality of processes and acquiring the press formed part analysis model at the forming bottom dead center;

a press formed part analysis model springback amount calculation step of performing the spring-back analysis by giving, to the press formed part analysis model at the forming bottom dead center, the same constraint condition as the predetermined constraint condition given to the press formed part workpiece shape model in the actual press formed part springback amount calculation step, and calculating the springback amount generated in the press formed part analysis model; and a springback amount comparison/evaluation step of comparing the springback amount of the actual press formed part calculated in the actual press formed part springback amount calculation step with the springback amount of the press formed part analysis model calculated in the press formed part analysis model springback amount calculation step and evaluating the springback amounts of the actual press formed part and the press formed part analysis model;

ii. an analysis condition adjustment step of adjusting an analysis condition of the press formed part analysis model in the mechanical analysis including the process of press forming the actual press formed part and the subsequent springback process so as to improve the acquired prediction accuracy of the springback amount of the press formed part analysis model; and iii. a press forming condition adjustment step of adjusting the press forming condition in the mechanical analysis including the process of press forming the actual press formed part so as to allow the springback amount of the press formed part analysis model obtained under the adjusted analysis condition to fall within a predetermined range.

2. The method according to claim 1, wherein the elastic mechanical analysis is elastic finite element analysis, and the elasto-plastic mechanical analysis is elasto-plastic finite element analysis.

3. The method according to claim 1, further comprising dividing the process of press forming the actual press formed part for respective portions of the actual press formed part, wherein the press forming die model in the actual press formed part springback amount calculation step is formed as one press forming die model obtained by synthesizing press forming die models of respective press forming dies adopted to press-form the respective portions of the actual press formed part.

4. A device for determining an adjusted press forming condition for manufacturing an actual press formed part having improved dimensional accuracy using a press forming die by evaluating a springback amount of a press formed part by comparing a springback amount of an actual press formed part obtained by actually press forming a blank using the press forming die with a springback amount of a press formed part analysis model obtained by elasto-plastic mechanical analysis including a process of press forming the actual press formed part and evaluating the springback amounts of the actual press formed part and the press formed part analysis model, the device comprising:

a press formed part workpiece shape model acquisition unit configured to:

generate a press formed part workpiece shape model from three-dimensional surface profile measurement data acquired by measuring a surface profile of the actual press formed part after die release of the actual press formed part and springback thereof, perform elastic mechanical analysis including a process of sandwiching the press formed part workpiece shape model up to a forming bottom dead center by a press forming die model of the press forming die, and acquire the press formed part workpiece shape model at the forming bottom dead center;

an actual press formed part springback amount calculation unit configured to:

perform spring-back analysis by giving a predetermined constraint condition to the press formed part workpiece shape model at the acquired forming bottom dead center, and calculate a springback amount generated in the press formed part workpiece shape model as the springback amount of the actual press formed part;

a press formed part analysis model acquisition unit configured to perform the elasto-plastic mechanical analysis including a process of press forming a blank model of the blank by the press forming die model over a single process or a plurality of processes, and acquire the press formed part analysis model at the forming bottom dead center;

a press formed part analysis model springback amount calculation unit configured to:

perform the spring-back analysis by giving, to the press formed part analysis model at the forming bottom dead center, a same constraint condition as the predetermined constraint condition given to the press formed part workpiece shape model by the actual press formed part springback amount calculation unit, and calculate the springback amount generated in the press formed part analysis model; and a springback amount comparison/evaluation unit configured to:

compare the springback amount of the actual press formed part calculated in the actual press formed part springback amount calculation unit with the springback amount of the press formed part analysis model calculated by the press formed part analysis model springback amount calculation unit, and evaluate the springback amounts of the actual press formed part and the press formed part analysis model, wherein the apparatus is configured to further perform, to determine the adjusted press forming condition:

an analysis condition adjustment step of adjusting an analysis condition of the press formed part analysis model in the mechanical analysis including the process of press forming the actual press formed part and the subsequent springback process so as to improve the acquired prediction accuracy of the springback amount of the press formed part analysis model; and a press forming condition adjustment step of adjusting the press forming condition in the mechanical analysis including the process of press forming the actual press formed part so as to allow the springback amount of the press formed part analysis model obtained under the adjusted analysis condition to fall within a predetermined range.

5. A method of manufacturing a press formed part, the method being performed to manufacture an actual press formed part having improved dimensional accuracy obtained by adjusting a press forming condition so as to reduce a springback amount and comprising:

a springback amount prediction accuracy acquisition step of acquiring, as prediction accuracy of a springback amount of a press formed part analysis model, a difference between a springback amount after die release of the actual press formed part obtained by actually press forming a blank using a press forming die and the springback amount of the press formed part analysis model obtained by mechanical analysis including a process of press forming the actual press formed part and a subsequent springback process based on the method of evaluating the springback amount of the press formed part according to claim 1;

an analysis condition adjustment step of adjusting an analysis condition of the press formed part analysis model in the mechanical analysis including the process of press forming the actual press formed part and the subsequent springback process so as to improve the acquired prediction accuracy of the springback amount of the press formed part analysis model;

a press forming condition adjustment step of adjusting the press forming condition in the mechanical analysis including the process of press forming the actual press formed part so as to allow the springback amount of the press formed part analysis model obtained under the adjusted analysis condition to fall within a predetermined range; and a press forming step of actually press forming the actual press formed part using the press forming die under the press forming condition adjusted in the press forming condition adjustment step.

6. A non-transitory computer-readable recording medium on which an executable program for determining an adjusted press forming condition for manufacturing an actual press formed part having improved dimensional accuracy using a press forming die by evaluating a springback amount of a press formed part by comparing a springback amount of an actual press formed part obtained by actually press forming a blank using the press forming die with a springback amount of a press formed part analysis model obtained by elasto-plastic mechanical analysis including a process of press forming the actual press formed part and evaluating the springback amounts of the actual press formed part and the press formed part analysis model, the program causing a processor of a computer to execute:

a press formed part workpiece shape model acquisition step of generating a press formed part workpiece shape model from three-dimensional surface profile measurement data acquired by measuring a surface profile of the actual press formed part after die release of the actual press formed part and springback thereof, performing elastic mechanical analysis including a process of sandwiching the press formed part workpiece shape model up to a forming bottom dead center by a press forming die model of the press forming die, and acquiring the press formed part workpiece shape model at the forming bottom dead center;

an actual press formed part springback amount calculation step of performing spring-back analysis by giving a predetermined constraint condition to the acquired
press formed part workpiece shape model at the form-
ing bottom dead center and calculating a springback
amount generated in the press formed part workpiece
shape model as the springback amount of the actual
press formed part;
a press formed part analysis model acquisition step of
performing the elasto-plastic mechanical analysis
including a process of press forming a blank model of
the blank by the press forming die model over a single
process or a plurality of processes and acquiring the
press formed part analysis model at the forming bottom
dead center;
a press formed part analysis model springback amount
calculation step of performing the spring-back analysis
by giving, to the press formed part analysis model at the
forming bottom dead center, the same constraint con-
dition as the predetermined constraint condition given
to the press formed part workpiece shape model in the
actual press formed part springback amount calculation
step, and calculating the springback amount generated
in the press formed part analysis model; and
a springback amount comparison/evaluation step of com-
paring the springback amount of the actual press
formed part calculated in the actual press formed part springback amount calculation step with the springback
amount of the press formed part analysis model calcu-
lated in the press formed part analysis model spring-
back amount calculation step and evaluating the spring-
back amounts of the actual press formed part and the
press formed part analysis model;
wherein the program is further configured to cause the
processor to execute, to determine the adjusted press form-
ing condition:
an analysis condition adjustment step of adjusting an
analysis condition of the press formed part analysis
model in the mechanical analysis including the process
of press forming the actual press formed part and the
subsequent springback process so as to improve the
acquired prediction accuracy of the springback amount
of the press formed part analysis model; and
a press forming condition adjustment step of adjusting the
press forming condition in the mechanical analysis
including the process of press forming the actual press
formed part so as to allow the springback amount of the
press formed part analysis model obtained under the
adjusted analysis condition to fall within a predeter-
mined range.

* * * * *